United States Patent
Xu et al.

(10) Patent No.: US 12,471,184 B2
(45) Date of Patent: Nov. 11, 2025

(54) COMMUNICATION METHOD AND COMMUNICATION APPARATUS

(71) Applicant: HUAWEI TECHNOLOGIES CO., LTD., Shenzhen (CN)

(72) Inventors: Bin Xu, Beijing (CN); Bingzhao Li, Beijing (CN); Zhenzhen Cao, Boulogne Billancourt (FR); Yan Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 246 days.

(21) Appl. No.: 18/170,755

(22) Filed: Feb. 17, 2023

(65) Prior Publication Data
US 2023/0209652 A1 Jun. 29, 2023

Related U.S. Application Data

(63) Continuation of application No. PCT/CN2020/109640, filed on Aug. 17, 2020.

(51) Int. Cl.
*H04W 76/40* (2018.01)
(52) U.S. Cl.
CPC .................... *H04W 76/40* (2018.02)
(58) Field of Classification Search
CPC ..................................... H04W 76/40
See application file for complete search history.

(56) References Cited

U.S. PATENT DOCUMENTS

| 2019/0246421 | A1 | 8/2019 | Zhou et al. | |
| 2020/0077287 | A1* | 3/2020 | Prasad | H04W 72/30 |
| 2023/0179343 | A1* | 6/2023 | Navrátil | H04L 1/1896 |
| | | | | 370/328 |
| 2023/0179962 | A1* | 6/2023 | Qi | H04L 1/0026 |
| | | | | 370/329 |
| 2023/0254666 | A1* | 8/2023 | Qi | H04W 28/0268 |
| | | | | 370/329 |
| 2023/0262734 | A1* | 8/2023 | Qi | H04L 12/189 |
| | | | | 455/414.1 |
| 2023/0354106 | A1* | 11/2023 | Godin | H04W 36/0085 |

FOREIGN PATENT DOCUMENTS

| CN | 109792311 A | 5/2019 |
| CN | 111356174 A | 6/2020 |
| WO | 2019161927 A1 | 8/2019 |

OTHER PUBLICATIONS

Huawei Dynamic Control of the MBS Transmission Area 3GPPTSG-RAN3 Meeting#109-a R3-204693,Jul. 8, 2020, total 2 pages.
(Continued)

*Primary Examiner* — Ajay Cattungal
(74) *Attorney, Agent, or Firm* — HAUPTMAN HAM, LLP

(57) ABSTRACT

A communication method and a communication apparatus. A central unit determines a first transmission mode of a first service, where the first transmission mode is a point-to-point transmission mode or a point-to-multipoint transmission mode. The central unit indicates a distributed unit to transmit a first data packet of the first service in the first transmission mode.

20 Claims, 5 Drawing Sheets

(56) References Cited

OTHER PUBLICATIONS

3GPP TS 36.300 V15.8.0:"3rd Generation Partnership Project;Technical Specification Group Radio Access Network; Evolved Universal Terrestrial Radio Access (E-UTRA) and Evolved Universal Terrestrial Radio Access Network (E-UTRAN);Overall description;Stage 2(Release 15)",Dec. 2019,total 365 pages.

3GPP TS 38.300 V15.10.0:"3rd Generation Partnership Project; Technical Specification Group Radio Access Network; NR; NR and NG-RAN Overall Description; Stage 2 (Release 15)",Jul. 2020,total 100 pages.

3GPP TS 38.323 V16.1.0 (Jul. 2020), 3rd Generation Partnership Project; Technical Specification Group Radio Access Network; NR; Packet Data Convergence Protocol (PDCP) specification(Release 16), 40 pages.

3GPP TS 38.331 V16.1.0 (Jul. 2020), 3rd Generation Partnership Project;Technical Specification Group Radio Access Network; NR;Radio Resource Control (RRC) protocol specification(Release 16), 911 pages.

3GPP TS 38.401 V16.2.0 (Jul. 2020), 3rd Generation Partnership Project; Technical Specification Group Radio Access Network; NG-RAN; Architecture description(Release 16), 77 pages.

3GPP TS 38.413 V16.2.0 (Jul. 2020), 3rd Generation Partnership Project; Technical Specification Group Radio Access Network; NG-RAN; NG Application Protocol (NGAP)(Release 16), 462 pages.

3GPP TS 38.473 V15.10.0 (Jul. 2020), 3rd Generation Partnership Project; Technical Specification Group Radio Access Network; NG-RAN; F1 application protocol (F1AP)(Release 15), 222 pages.

Huawei: "Dynamic Control of the MBS Transmission Area", 3GPP Draft; R3-204693, 3rd Generation Partnership Project (3GPP), Aug. 7, 2020, XP051915590 ,total 2 pages.

David Vargas et al: "Broadcast and Multicast Communication Enablers for the Fifth-Generation of Wireless Systems Deliverable D3.3 RAN Logical Architecture and Interfaces for 5G-Xcast", Feb. 28, 2019, XP055685520 .total 95 pages.

Extended European Search Report issued in corresponding European Application No. 20949738.7, dated Aug. 21, 2023, pp. 1-9.

* cited by examiner

1

COMMUNICATION METHOD AND COMMUNICATION APPARATUS

CROSS-REFERENCE TO RELATED APPLICATIONS

Embodiments described herein are a continuation of International Application No. PCT/CN2020/109640, filed on Aug. 17, 2020, the disclosure of which is hereby incorporated by reference in its entirety.

TECHNICAL FIELD

This application relates to the communication field, and more specifically, to a communication method and a communication apparatus.

BACKGROUND

Multicast broadcast services (multicast broadcast services, MBSs) are services, such as live services, some public safety services, and batch software update services, oriented to a plurality of terminal devices.

The MBS service is from a data server. First, the data server sends MBS service data to a core network device, then the core network device sends the MBS service data to an access network device, and the access network device sends the MBS service data to the terminal devices that receive the MBS service.

There are two transmission modes in which the access network device sends the MBS service data to the terminal devices. A first transmission mode is a point-to-multipoint (point to multipoint, PTM) transmission mode. To be specific, the access network device simultaneously sends, through group scheduling, the MBS service data to the plurality of terminal devices. A second transmission mode is a point-to-point (point-to-point, PTP) transmission mode, namely, a technology in which the access network device separately sends, through dedicated scheduling, the MB S service to each terminal device.

An access network architecture in which a central unit and a distributed unit are separated from each other is introduced into a 5th generation (5th generation, 5G) mobile communication system. The access network device includes the central unit (central unit, CU) and the distributed unit (distributed unit, DU). How to transmit the MBS service data in the access network architecture in which the central unit and the distributed unit are separated from each other is a technical problem that needs to be resolved by a person skilled in the art.

SUMMARY

Embodiments described here provide a communication method and a communication apparatus, to improve reliability of transmitting the first service data.

According to a first aspect, a communication method is provided. The method is performed by a central unit or a module (for example, a chip) configured (or used) in the central unit. The following uses an example in which the method is performed by the central unit for description.

The method includes: The central unit determines a first transmission mode of a first service, where the first transmission mode is a point-to-point transmission mode or a point-to-multipoint transmission mode. The central unit indicates a distributed unit to transmit a first data packet of the first service in the first transmission mode.

According to the foregoing solution, after determining the transmission mode of the first service, the central unit notifies the distributed unit, to dynamically switch the transmission mode of the first service. This improves reliability of transmitting the first service data.

With reference to the first aspect, in some implementations of the first aspect, that the central unit determines a first transmission mode of a first service includes: The central unit determines the first transmission mode of the first service based on first assistance information from a terminal device or second assistance information from a core network, where the second assistance information includes information indicating whether the terminal device is interested in the first service or location information of the terminal device, and the first assistance information includes at least one of the following: the information indicating whether the terminal device is interested in the first service, the location information of the terminal device, a measurement report of the terminal device, and data packet receiving status feedback information of the terminal device, where the data packet receiving status feedback information of the terminal device indicates a status of receiving at least one data packet of the first service by the terminal device.

According to the foregoing solution, the CU dynamically switches the transmission mode of the first service based on an actual status of the terminal device, so that reliability of transmitting MBS data is improved. With reference to the first aspect, in some implementations of the first aspect, the data packet receiving status feedback information of the terminal device is packet data convergence protocol PDCP feedback information.

With reference to the first aspect, in some implementations of the first aspect, that the central unit indicates a distributed unit to transmit a first data packet of the first service in the first transmission mode includes: The central unit sends first indication information to the distributed unit, where the first indication information indicates the distributed unit to transmit the first data packet in the first transmission mode.

Based on the foregoing solution, after determining the transmission mode of the first service based on an actual status of the terminal device, the CU notifies the DU by using the indication information, to dynamically switch the transmission mode of the first service. This improves reliability of transmitting MBS data.

With reference to the first aspect, in some implementations of the first aspect, that the first indication information indicates the distributed unit to transmit the first data packet in the first transmission mode includes: the first indication information indicates the distributed unit to transmit the first data packet to a first terminal device in the first transmission mode.

With reference to the first aspect, in some implementations of the first aspect, the first indication information is carried in a header corresponding to the data packet of the first service, or the first indication information is carried in control signaling, where the control signaling is signaling of a first interface or a control protocol data unit, and the first interface is an interface between the central unit and the distributed unit.

With reference to the first aspect, in some implementations of the first aspect, that the central unit indicates a distributed unit to transmit a first data packet of the first service in the first transmission mode includes: the central unit transmits the first data packet to the distributed unit through a first transmission channel, where in response to the first transmission mode being the point-to-point transmission mode, the first transmission channel corresponds to one terminal device; or in response to the first transmission mode being the point-to-multipoint transmission mode, the first transmission channel corresponds to a plurality of terminal devices.

According to the foregoing solution, after determining the transmission mode of the first service based on an actual status of the terminal device, the CU notifies the DU of the transmission mode of the corresponding first service through the transmission channel for transferring the data packet, to dynamically switch the transmission mode of the first service. This improves reliability of transmitting MBS data.

With reference to the first aspect, in some implementations of the first aspect, the first service includes a plurality of data packets, and the first data packet is at least one of the plurality of data packets.

According to a second aspect, a communication method is provided. The method is performed by a distributed unit or a module (for example, a chip) configured (or used) in the distributed unit. The following uses an example in which the method is performed by the distributed unit for description.

The method includes: The distributed unit determines, based on assistance information from a terminal device or an indication of a central unit, to transmit a first data packet of a first service in a first transmission mode, where the first transmission mode is a point-to-point transmission mode or a point-to-multipoint transmission mode. The distributed unit transmits the first data packet in the first transmission mode.

According to the foregoing solution, after determining the transmission mode of the first service, the distributed unit notifies the distributed unit, to dynamically switch the transmission mode of the first service. This improves reliability of transmitting first service data.

With reference to the second aspect, in some implementations of the second aspect, that the distributed unit determines, based on assistance information from a terminal device or an indication of a central unit, to transmit a first data packet of a first service in a first transmission mode includes: The distributed unit determines whether the indication of the central unit is received. In response to the distributed unit receiving the indication of the central unit, the distributed unit determines, based on the indication of the central unit, to transmit the first data packet in the first transmission mode.

According to the foregoing solution, a priority of the transmission mode of the first service determined by the central unit is higher than that of the transmission mode of the first service determined by the distributed unit. In response to receiving the indication of the central unit, the distributed unit determines the transmission mode of the first service based on the indication of the central unit, to dynamically switch the transmission mode of the first service. This improves reliability of transmitting first service data.

With reference to the second aspect, in some implementations of the second aspect, that the distributed unit determines, based on assistance information from a terminal device or an indication of a central unit, to transmit a first data packet of a first service in a first transmission mode includes: The distributed unit determines, based on a determining manner with a higher priority in a priority of a first determining manner and a priority of a second determining manner, to transmit the first data packet in the first transmission mode, where the first determining manner is determining a transmission mode of the first service based on the assistance information from the terminal device, and the second determining manner is determining the transmission mode of the first service based on the indication of the distributed unit.

According to the foregoing solution, a priority of the transmission mode of the first service determined by the central unit is higher than that of the transmission mode of the first service determined by the distributed unit. In response to receiving the indication of the central unit, the distributed unit determines the transmission mode of the first service based on the indication of the central unit, to dynamically switch the transmission mode of the first service. This improves reliability of transmitting first service data.

With reference to the second aspect, in some implementations of the second aspect, that the distributed unit determines, based on an indication of a central unit, to transmit a first data packet of a first service in a first transmission mode includes: The distributed unit receives first indication information from the central unit, where the first indication information indicates the distributed unit to transmit the first data packet in the first transmission mode.

With reference to the second aspect, in some implementations of the second aspect, that the first indication information indicates the distributed unit to transmit the first data packet in the first transmission mode includes: the first indication information indicates the distributed unit to transmit the first data packet to a first terminal device in the first transmission mode.

With reference to the second aspect, in some implementations of the second aspect, the first indication information is carried in a header corresponding to the data packet of the first service, or the first indication information is carried in control signaling, where the control signaling is signaling of a first interface or a control protocol data unit, and the first interface is an interface between the central unit and the distributed unit.

With reference to the second aspect, in some implementations of the second aspect, that the distributed unit determines, based on an indication of a central unit, to transmit a first data packet of a first service in a first transmission mode includes: The distributed unit receives the first data packet from the distributed unit through a first channel, where in response to the first channel being a dedicated tunnel corresponding to one terminal device, the first transmission mode is the point-to-point transmission mode; or in response to the first channel being a shared tunnel corresponding to a plurality of terminal devices, the first transmission mode is the point-to-multipoint transmission mode.

With reference to the second aspect, in some implementations of the second aspect, the first service includes a plurality of data packets, and the first data packet is at least one of the plurality of data packets.

With reference to the second aspect, in some implementations of the second aspect, the assistance information of the terminal device includes one or more of the following: channel state information of the terminal device, beam information of the terminal device, and location information of the terminal device.

According to a third aspect, a communication method is provided. The method is performed by a terminal device or a module (for example, a chip) configured (used) in the terminal device. The following uses an example in which the method is performed by the terminal device for description.

The method includes: The terminal device receives a data packet of a first service from a network device. In response to a transmission mode of the first service changing, the terminal device sends data packet receiving status feedback information of the terminal device to the network device.

According to the foregoing solution, the terminal device feeds back a receiving status of the data packet in time, so that the network device dynamically switches the transmission mode of the first service based on the feedback information of the terminal device, or retransmits the data packet in time in response to a packet loss occurring after the switching. This improves reliability of transmitting first service data.

With reference to the third aspect, in some implementations of the third aspect, the data packet receiving status feedback information of the terminal device is packet data convergence protocol PDCP feedback information.

With reference to the third aspect, in some implementations of the third aspect, the method further includes: the terminal device receives second indication information from the network device, where the second indication information indicates that the transmission mode of the first service changes.

According to the foregoing solution, the terminal device determines, based on the indication information from the network device, that the transmission mode of the first service changes, to feed back a receiving status of the data packet in time, so that the data packet is retransmitted in time in response to a packet loss occurring after switching. This improves reliability of transmitting first service data.

With reference to the third aspect, in some implementations of the third aspect, the method further includes: the terminal device determines, based on a first radio network temporary identifier RNTI, that the transmission mode of the first service changes, where the first RNTI is a temporary identifier used by scheduling information corresponding to the data packet of the first service. Alternatively, the terminal device determines, based on a logical channel identifier, that the transmission mode of the MBS data packet changes, where the logical channel identifier is carried in a header corresponding to the data packet of the first service.

According to the foregoing solution, the terminal device determines, based on the RNTI, that the transmission mode of the first service changes, to feed back a receiving status of the data packet in time, so that the data packet is retransmitted in time in response to a packet loss occurring after switching. This improves reliability of transmitting first service data.

According to a fourth aspect, a communication apparatus is provided, and includes modules or units configured to perform the method according to any one of the first aspect.

According to a fifth aspect, a communication apparatus is provided, and includes a processor. The processor is coupled to a memory, and is configured to execute instructions in the memory, to implement the method according to any one of the first aspect. Optionally, the communication apparatus further includes a memory. Optionally, the communication apparatus further includes a communication interface. The processor is coupled to the communication interface.

In an implementation, the communication apparatus is a central unit. In response to the communication apparatus being the central unit, the communication interface is a transceiver or an input/output interface.

In another implementation, the communication apparatus is a chip configured in a central unit. in response to the communication apparatus being the chip configured in the central unit, the communication interface is an input/output interface.

Optionally, the transceiver is a transceiver circuit. Optionally, the input/output interface is an input/output circuit.

According to a sixth aspect, a communication apparatus is provided, and includes modules or units configured to perform the method according to any one of the second aspect.

According to a seventh aspect, a communication apparatus is provided, and includes a processor. The processor is coupled to a memory, and is configured to execute instructions in the memory, to implement the method according to any one of the second aspect. Optionally, the communication apparatus further includes a memory. Optionally, the communication apparatus further includes a communication interface. The processor is coupled to the communication interface.

In an implementation, the communication apparatus is a distributed unit. In response to the communication apparatus being the distributed unit, the communication interface is a transceiver or an input/output interface.

In another implementation, the communication apparatus is a chip configured in a distributed unit. In response to the communication apparatus being the chip configured in the distributed unit, the communication interface is an input/output interface.

Optionally, the transceiver is a transceiver circuit. Optionally, the input/output interface is an input/output circuit.

According to an eighth aspect, a communication apparatus is provided, and includes each module or unit configured to perform the method in any one of the third aspect.

According to a ninth aspect, a communication apparatus is provided, and includes a processor. The processor is coupled to a memory, and is configured to execute instructions in the memory, to implement the method according to any one of the third aspect. Optionally, the communication apparatus further includes a memory. Optionally, the communication apparatus further includes a communication interface. The processor is coupled to the communication interface.

In an implementation, the communication apparatus is a terminal device. In response to the communication apparatus being the terminal device, the communication interface is a transceiver or an input/output interface.

In another implementation, the communication apparatus is a chip configured in a terminal device. In response to the communication apparatus is the chip configured in the terminal device, the communication interface is an input/output interface.

Optionally, the transceiver is a transceiver circuit. Optionally, the input/output interface is an input/output circuit.

According to a tenth aspect, a processor is provided, and includes: an input circuit, an output circuit, and a processing circuit. The processing circuit is configured to: receive a signal by using the input circuit, and transmit the signal by using the output circuit, so that the processor performs the method according to any one of the first aspect to the third aspect.

In a specific implementation process, the processor is one or more chips, the input circuit is an input pin, the output circuit is an output pin, and the processing circuit is a transistor, a gate circuit, a trigger, any logic circuit, or the like. An input signal received by the input circuit is received and input by, for example, but not limited to, a receiver, a signal output by the output circuit is output to, for example, but not limited to, a transmitter and transmitted by the transmitter, and the input circuit and the output circuit is a same circuit, where the circuit is used as the input circuit and the output circuit at different moments. Specific implementations of the processor and the various circuits are not limited in at least one embodiment.

According to an eleventh aspect, a processing apparatus is provided, and includes a processor and a memory. The processor is configured to read instructions stored in the memory, and receives a signal by using a receiver, and transmit a signal by using a transmitter, to perform the method according to any one of the first aspect to the third aspect.

Optionally, there are one or more processors, and there are one or more memories.

Optionally, the memory is integrated with the processor, or the memory and the processor are separately disposed.

During specific implementation, the memory is a non-transitory (non-transitory) memory, such as a read-only memory (read-only memory, ROM). The memory and the processor is integrated into one chip, or is separately disposed in different chips. A type of the memory and a manner in which the memory and the processor are disposed are not limited in this embodiment.

A related data exchange process such as sending indication information is a process of outputting the indication information from the processor, and receiving capability information is a process of receiving the input capability information by the processor. Specifically, data output by the processor is output to the transmitter, and input data received by the processor is from the receiver. The transmitter and the receiver is collectively referred to as a transceiver.

The processing apparatus in the eleventh aspect is one or more chips. The processor in the processing apparatus is implemented by hardware, or is implemented by software. In response to the processor being implemented by the hardware, the processor is a logic circuit, an integrated circuit, or the like. In response to the processor being implemented by the software, the processor is a general-purpose processor, and is implemented by reading software code stored in a memory. The memory is integrated into the processor, or is located outside the processor and exist independently.

According to a twelfth aspect, a computer program product is provided. The computer program product includes a computer program (which is also referred to as code or instructions). In response to the computer program being run, a computer is enabled to perform the method according to any one of the first aspect to the third aspect.

According to a thirteenth aspect, a computer-readable storage medium is provided. The computer-readable storage medium stores a computer program (which is also referred to as code or instructions). In response to the computer program being run on a computer, the computer is enabled to perform the method according to any one of the first aspect to the third aspect.

According to a fourteenth aspect, a communication system is provided, and includes the foregoing central unit and distributed unit, or includes a terminal device and a network device. Optionally, the network device includes the central unit and/or the distributed unit.

DESCRIPTION OF EMBODIMENTS

The technical solutions in embodiments described herein are applied to various communication systems, for example, a 5th generation (5th generation, 5G) communication system, a new radio (new radio, NR) access technology, and a future communication system.

Figure 1:
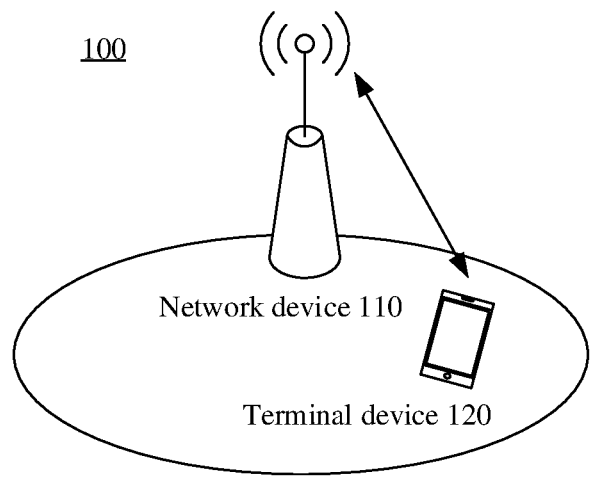
FIG. 1 is a schematic diagram of a wireless communication system 100 applicable to at least one embodiment.

FIG. 1 is a schematic diagram of a wireless communication system 100 applicable to at least one embodiment.

As shown in FIG. 1, the wireless communication system 100 includes at least one access network device, for example, an access network device 110 shown in FIG. 1. The wireless communication system 100 further includes at least one terminal device, for example, a terminal device 120 and a terminal device 130 shown in FIG. 1. The access network device 110 sends MBS service data to the terminal device 120 and the terminal device 130, and transmits the MBS service data in a PTM transmission mode, or transmits the MBS service data in a PTP transmission mode, or switches a transmission mode of the MBS service data based on a status. However, embodiments described herein are not limited thereto.

The terminal device in at least one embodiment is also referred to as a user equipment (user equipment, UE), an access terminal, a subscriber unit, a subscriber station, a mobile station (mobile station, MS), a remote station, a remote terminal, a mobile terminal (mobile terminal, MT), a mobile device, a user terminal, a terminal, a wireless communication device, a user agent, a user apparatus, or the like. The terminal device in embodiments of at least one embodiment is: a mobile phone (mobile phone), a tablet computer (pad), a computer having a wireless transceiver function, a mobile internet device (mobile internet device, MID), a virtual reality (virtual reality, VR) terminal device, an augmented reality (augmented reality, AR) terminal device, a wireless terminal in industrial control (industrial control), a wireless terminal in self-driving (self-driving), a wireless terminal in remote (remote medical), a wireless terminal in a smart grid (smart grid), a wireless terminal in transportation safety (transportation safety), a wireless terminal in a smart city (smart city), a wireless terminal in a smart home (smart home), a cellular phone, a cordless phone, a session initiation protocol (session initiation protocol, SIP) phone, a wireless local loop (wireless local loop, WLL) station, a personal digital assistant (personal digital assistant, PDA), a handheld device or computing device having a wireless communication function, another processing device connected to a wireless modem, a vehicle-mounted device, a wearable device, a terminal device in a 5G network, a terminal device in a future evolved public land mobile communication network (public land mobile network, PLMN), or the like.

A specific form of the terminal device is not limited in embodiments described herein.

Figure 2:
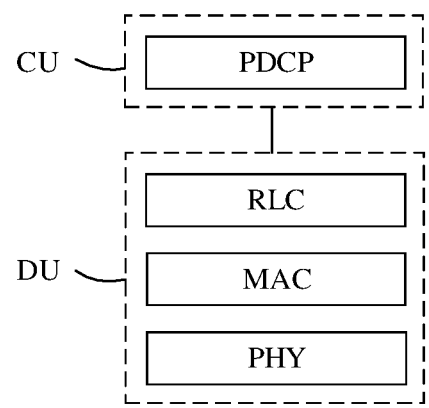
FIG. 2 is a schematic diagram of an applicable protocol stack of a radio access network device.

The network device in at least one embodiment is a device having a wireless transceiver function. The device includes but is not limited to: an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB or a home NodeB, HNB), a baseband unit (baseband unit, BBU), an access point (access point, AP) in a wireless fidelity (wireless fidelity, Wi-Fi) system, a wireless relay node, a wireless backhaul node, and a transmission point (transmission reception point, TRP or transmission point, TP); or is a gNB or a transmission point (TRP or TP) in a 5G system such as an NR system, one or one group of antenna panels (including a plurality of antenna panels) of a base station in a 5G system; or is a network node forming a gNB or a transmission point, such as a baseband unit (BBU) or a distributed unit (DU, distributed unit). The network device is an access network device gNB in a 5G (for example, new radio (new radio, NR)) system, and the gNB includes a CU and a DU. The gNB further includes an active antenna unit (active antenna unit, AAU for short). The CU implements some functions of the gNB, and the DU implements some functions of the gNB. For example, the CU is responsible for processing a non-real-time protocol and a service, and implements functions of a radio resource control (radio resource control, RRC) layer and a packet data convergence protocol (packet data convergence protocol, PDCP) layer. The DU is responsible for processing a physical layer protocol and a real-time service, and implements functions of a radio link control (radio link control, RLC) layer, a media access control (media access control, MAC) layer, and a physical (physical, PHY) layer. For example, FIG. 2 is a schematic diagram of a protocol stack of a radio access network device according to at least one embodiment. However, embodiments described herein are not limited thereto. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling is also considered as being sent by the DU or sent by the DU and the AAU. The access network device is a device including one or more of a CU node, a DU node, and an AAU node. In addition, the CU is classified as an access network device in an access network (radio access network, RAN), or the CU is classified as an access network device in a core network (core network, CN). This is not limited in embodiments described herein.

For ease of understanding embodiments described herein, the following describes some terms in embodiments described herein, to help a person skilled in the art have a better understanding.

(1) A point-to-multipoint (PTM) transmission mode, which is also referred to as a group scheduling manner or a multicast transmission mode, is a transmission mode in which data of a service is simultaneously sent to a plurality of terminal devices by using a network device. In response to PTM transmission being used, the plurality of terminal devices simultaneously receive same data in a sending process of the network device (for example, a base station). Currently, PTM is mainly classified into two types: a multimedia broadcast multicast service single frequency network (multimedia broadcast multicast service single frequency network, MBSFN) service and a single-cell point-to-multipoint (single-cell point-to-multipoint, SC-PTM) service. This MBSFN manner means that a plurality of mutually synchronized cells (for example, a plurality of base stations) in an MBSFN area simultaneously transmit same information to the plurality of terminal devices, and the terminal devices receive single data obtained through superposition. In this way, strength of a received signal is improved, and inter-cell interference is eliminated. This SC-PTM manner means that an MBS service is transmitted by using only one cell (for example, one base station), and one network device simultaneously performs group scheduling on the plurality of terminal devices.

(2) That sending is performed in the PTM transmission mode means: In response to sending a transport block (transport block, TB) corresponding to a protocol data unit (protocol data unit, PDU), an apparatus scrambles the PDU or downlink control information (downlink control information, DCI) corresponding to the PDU by using a group radio network temporary identifier (group radio network temporary identifier, G-RNTI), and one or more apparatuses simultaneously receive the same PDU based on the same G-RNTI. Alternatively, that a PDU is transmitted in the PTM transmission mode means: A plurality of apparatuses are notified of a location of the same PDU in a semi-persistent manner, and the plurality of apparatuses simultaneously receives the PDU. Alternatively, that a PDU is transmitted in the PTM transmission mode means: The PDU is transmitted on a radio bearer established for multicast transmission or on a channel specially designed for multicast.

That receiving is performed in the PTM manner means: In response to sending being performed in the PTM manner, one of a plurality of receiving apparatuses receives the PDU based on the G-RNTI, or one of a plurality of receiving apparatuses receives the PDU on the radio bearer established for multicast transmission or on the channel used for multicast transmission.

In at least one embodiment, groupcast is a specific manner of multicast. Therefore, multicast is also referred to as groupcast.

(3) That sending is performed in a PTP transmission mode means: In response to sending a TB corresponding to a PDU, an apparatus scrambles the PDU or DCI corresponding to the PDU by using a cell radio network temporary identifier (cell network temporary identifier, C-RNTI), and only one apparatus simultaneously receives the same PDU based on the C-RNTI. Alternatively, that a PDU is transmitted in the PTP transmission mode means: The PDU is transmitted on a radio bearer established for unicast transmission or on a channel specially designed for unicast.

That receiving is performed in the PTP manner means: In response to sending being performed in the PTP transmission mode, one receiving apparatus receives the PDU based on the C-RNTI, or one apparatus receives the PDU on the radio bearer established for unicast transmission or on the channel used for unicast transmission.

The following describes, in detail with reference to the accompanying drawings, an information transmission method provided in at least one embodiment.

It should be noted that, a multimedia broadcast service MBS is used as an example for description in at least one embodiment. A communication method provided In at least one embodiment is further used for data transmission of another service. Embodiments described herein are not limited.

Figure 3:
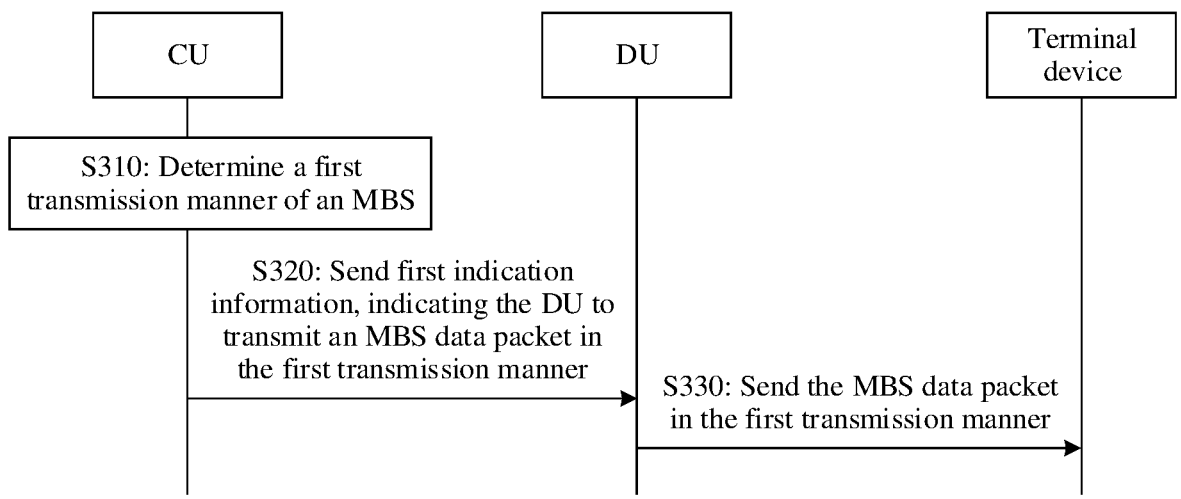
FIG. 3 is a schematic flowchart of a communication method according to at least one embodiment.

FIG. 3 is a schematic flowchart of a communication method according to at least one embodiment.

S310: A CU determines a first transmission mode of an MBS.

The first transmission mode is a transmission mode used by a DU to transmit an MBS data packet, and the first transmission mode is a point-to-point PTP transmission mode or a point-to-multipoint PTM transmission mode. In other words, the CU determines whether the PTM transmission mode or the PTP transmission mode is used by the DU to send the MBS data packet to a terminal device.

Optionally, the CU determines the first transmission mode based on first assistance information from the terminal device. The first assistance information includes but is not limited to one or more of the following 1 to 5:

1. Measurement Report of the Terminal Device

For example, the measurement report of the terminal device includes channel state information (channel state information, CSI). The terminal device measures a reference signal sent by an access network device to obtain the CSI, and feeds back the CSI to the access network device. The CU determines, based on obtained CSI fed back by M terminal devices that receive the MBS data packet, the transmission mode used to send the MBS data packet. For example, in response to CSI fed back by N terminal devices in the M terminal devices indicating better channel quality (where, for example, the better channel quality is that the CSI is higher than a preset threshold, but embodiments described herein are not limited thereto), the CU determines to send the MBS data packet to the N terminal devices in the PTM transmission mode (where, to be specific, the first transmission mode is the PTM transmission mode), to save air interface resources, where $0 \leq N \leq M$. In response to CSI fed back by L terminal devices in the M terminal devices indicating poorer channel quality, to ensure transmission reliability, the CU determines to separately send the MBS data packet to the L terminal devices in the PTP transmission mode (where, to be specific, the first transmission mode is the PTP transmission mode), where $0 \leq L \leq M$. However, embodiments described herein are not limited thereto.

2. Beam Information of the Terminal Device

For example, the terminal device sends the beam information of the terminal device to an access network device, which is specifically information about a receive beam of the terminal device. The CU obtains beam information reported by M terminal devices that receive the MBS data packet, where receive beams of N terminal devices in the M terminal devices is covered by one downlink beam. The CU determines to send the MBS data packet to the N terminal devices in the PTM transmission mode (where, to be specific, the first transmission mode is the PTM transmission mode), to save air interface resources. However, in response to L terminal devices in the M terminal devices not being covered by a common downlink beam with another terminal device, the CU determines to separately send the MBS data packet to the L terminal devices in the PTP transmission mode (where, to be specific, the first transmission mode is the PTP transmission mode), to improve reliability of the MBS. However, embodiments described herein are not limited thereto.

3. Location Information of the Terminal Device

For example, the CU performs area division based on location information of a plurality of terminal devices, and determines to send the MBS data packet to a plurality of terminal devices in a same area in the PTM transmission mode (where, to be specific, the first transmission mode is the PTM transmission mode). In response to an area including only one terminal device, the CU determines to send the MBS data packet to the terminal device in the PTP transmission mode (where, to be specific, the first transmission mode is the PTP transmission mode). However, embodiments described herein are not limited thereto.

For another example, the CU sends the MBS data packet to a terminal device at a cell edge in the PTP transmission mode (where, to be specific, the first transmission mode is the PTP transmission mode), to improve reliability of the MBS. However, embodiments described herein are not limited thereto.

4. Indication information A from the terminal device, where the indication information A indicates whether the terminal device intends to receive the MBS data packet.

In other words, the indication information A indicates information indicating whether the terminal device is interested in the MBS service. in response to the indication information A indicating information indicating that the terminal device is interested in the MBS, the terminal device intends to receive the MBS data packet. in response to the indication information A indicating information indicating that the terminal device is not interested in the MBS, the terminal device does not intend to receive the MB S data packet.

For example, the terminal device sends the indication information A to an access network device. After obtaining the indication information A from the terminal device, the CU determines, depending on whether the terminal device receives the MBS data packet, the transmission mode used to send the MBS. For example, in response to a plurality of terminal devices intending to receive the MBS data packet, the CU determines to send the MBS data packet to the plurality of terminal devices in the PTM transmission mode (where, to be specific, the first transmission mode is the PTM transmission mode). For example, in response to only one terminal device in a coverage range intending to receive the MB S data packet, the CU determines to send the MBS data packet to the terminal device in the PTP transmission mode (where, to be specific, the first transmission mode is the PTP transmission mode). However, embodiments described herein are not limited thereto.

5. Third indication information from the terminal device, where the third indication information indicates whether the MBS data packet sent by an access network device is successfully received. The third indication information is also referred to as data packet receiving status feedback information.

For example, the terminal device sends, to the CU, indication information whether the MBS data packet sent by the access network device (for example, sent by the DU in an access network) is successfully received. In response to the terminal device failing to receive a data packet, the data packet is resent to the terminal device in the PTP transmission mode (where, to be specific, the first transmission mode is the PTP transmission mode). Alternatively, in response to determining, based on the third indication information, that a quantity of MBS data packets that the terminal device fails to receive is greater than or equal to a preset threshold, the CU determines to transmit subsequent to-be-transmitted MBS data packets in the PTP transmission mode, to improve reliability of transmitting the MBS data packet. However, embodiments described herein are not limited thereto.

Optionally, the third indication information is carried in a PDCP status report sent by the terminal device.

Optionally, the first assistance information is information at an RRC layer or information at a PDCP layer.

For example, the first assistance information includes CSI of the terminal device, and the CSI of the terminal device is CSI obtained by the RRC layer in the CU. For another example, the first assistance information includes location information of the terminal device, and the location information of the terminal device is location information of the terminal device obtained by the RRC layer.

The first assistance information includes but is not limited to one or more of the foregoing 1 to 5. For example, first reference information includes the CSI of the terminal device and the location information of the terminal device. In response to an area obtained by the CU through division based on the location information of the terminal device including a plurality of terminal devices, and CSI fed back by one of the plurality of terminal devices (for example, a terminal device A) indicates poorer channel quality of the terminal device A, the CU determines to send the MBS data packet to other terminal devices than the terminal device A in the plurality of terminal devices in the PTM transmission mode (where, to be specific, the first transmission mode is the PTM transmission mode), and to send the MBS data packet to the terminal device A in the PTP transmission mode (where, to be specific, the first transmission mode is the PTP transmission mode). However, embodiments described herein are not limited thereto.

For another example, first reference information includes the CSI of the terminal device, the beam information of the terminal device, and the third indication information from the terminal device. In response to determining, based on the beam information of the terminal device, that a terminal device B and other terminal devices are in a coverage range of a same downlink beam, the CU sends the MBS data packet to the terminal device B and the other terminal devices in the PTM transmission mode by using the downlink beam. In response to CSI fed back by the terminal device B indicating poorer channel quality of the terminal device B, and the CU determines, by using the third indication information, that a quantity of data packets that the terminal device B fails to receive is greater than or equal to a threshold, the CU determines to send a subsequent MBS data packet to the terminal device B in the PTM transmission mode. However, embodiments described herein are not limited thereto.

Optionally, the CU determines the first transmission mode of the MBS based on second assistance information from a core network. The second assistance information includes information indicating whether the terminal device is interested in the MBS or the location information of the terminal device.

In an implementation, the terminal device reports, to a core network device, the location information of the terminal and indication information indicating whether the terminal is interested in the MB S service, so that the core network knows a status of the terminal device better. Therefore, the core network sends the foregoing two types of information to the CU as assistance information, for reference by the CU during decision-making. Alternatively, optionally, after making, based on the foregoing information, a decision on the transmission mode in which the DU transmits the MBS data packet, the core network sends a decision result to the CU.

S320: The CU sends first indication information to a DU, where the first indication information indicates the DU to send the MBS data packet in the first transmission mode.

Correspondingly, the DU receives the first indication information from the CU.

After determining, in S310, the transmission mode for sending the MBS data packet, the CU notifies, in S320 by using the first indication information, the DU to send the MBS data packet in the first transmission mode.

Optionally, the first indication information includes an identifier of the first transmission mode.

Optionally, the first indication information further includes first information, the first information indicates one or more terminal devices, and the one or more terminal devices are terminal devices that receive the MBS data packet.

In other words, the first indication information specifically indicates the DU to send the MBS data packet to the one or more terminal devices in the first transmission mode. Because the plurality of terminal devices receive the MBS service, the CU indicates the DU to send the data packet of the MBS service to specific terminal devices in the plurality of terminal devices in the first transmission mode, and to send the data packet of the MBS service to another terminal device in another transmission mode.

In an implementation, the first information includes identities of the one or more terminal devices (or includes an index, an index, and the like indicating the terminal device).

For example, the first transmission mode is the PTP transmission mode, in other words, the first indication information includes an identifier of the PTP transmission mode. The DU determines, based on the identifier of the PTP transmission mode, to send the MBS data packet in the PTP transmission mode. In addition, the first information in the first indication information includes identities of M terminal devices, and with reference to the identifier of the PTP transmission mode, the CU indicates, by using the first indication information, the DU to separately send the MBS data packet to the M terminal devices in the PTP transmission mode, where M≥1. However, embodiments described herein are not limited thereto.

For another example, the first transmission mode is the PTM transmission mode, in other words, the first indication information includes an identifier of the PTM transmission mode. The DU determines, based on the identifier of the PTM transmission mode, to send the MBS data packet in the PTM transmission mode. In addition, the first information in the first indication information includes identities of N terminal devices, and with reference to the identifier of the PTM transmission mode, the CU indicates, by using the first indication information, the DU to separately send the MBS data packet to the N terminal devices in the PTM transmission mode, where N≥1. However, embodiments described herein are not limited thereto.

In another implementation, the first information is a bit string (which is also referred to as a bitmap). Each bit in the bit string corresponds to one terminal device.

For example, the first indication information includes the identifier of the PTP transmission mode, and in response to one or more bits in the bit string of the first information being set to "1", the MBS data packet is sent, in the PTP transmission mode, to terminal devices corresponding to the one or more bits that are set to "1". Alternatively, in response to bits being set to "0", the MBS data packet is sent, in the PTP transmission mode, to terminal devices corresponding to the bits that are set to "0". However, embodiments described herein are not limited thereto.

For another example, the first indication information includes the identifier of the PTM transmission mode, and in response to one or more bits in the bit string of the first information being set to "1", the MBS data packet is sent, in the PTM transmission mode, to terminal devices corresponding to the one or more bits that are set to "1". Alternatively, in response to bits being set to "0", the MBS data packet is sent, in the PTM transmission mode, to terminal devices corresponding to the bits that are set to "0". However, embodiments described herein are not limited thereto.

For another example, the first information in the first indication information indicates both a transmission mode and a terminal device corresponding to the transmission mode. For example, the bit string of the first information includes 16 bits, and each bit corresponds to one terminal device. Specifically, in response to a bit being set to "1", the MBS data packet is sent, in the PTP transmission mode, to a terminal device corresponding to the bit, and in response to a bit being set to "0", the MBS data packet is sent, in the PTM transmission mode, to a terminal device corresponding to the bit; or on the contrary, in response to a bit being set to "0", the MBS data packet is sent, in the PTP transmission mode, to a terminal device corresponding to the bit, and in response to a bit being set to "1", the MBS data packet is sent, in the PTM transmission mode, to a terminal device corresponding to the bit. For example, the bit string with 16 bits in the first indication information sent by the CU to the DU is "1100 0000 0000 0000". In response to the first bit and the second bit in the bit string being set to "1", terminal devices corresponding to the first two bits use the PTP transmission mode, and terminal devices corresponding to other bits use the PTM transmission mode. However, embodiments described herein are not limited thereto.

Optionally, the first indication information further includes second information, the second information indicates one or more data packets of the MBS, and the first indication information specifically indicates to send the one or more data packets in the first transmission mode.

In an implementation, the second information indicates an index (index) (which is also referred to as an identifier (identifier, ID) or a sequence number (sequence number, SN)) of one MBS data packet and a quantity K of data packets, and indicates that K consecutive data packets starting from the data packet corresponding to the index indicated by the second information are sent in the first transmission mode.

For example, in response to the second information indicating a data packet whose index is 10 in the MBS data packets, and indicates a quantity K of data packets=20, the CU indicates the DU to send, in the first transmission mode, 10 consecutive data packets starting from the data packet whose index is 10, and the DU determines, based on the first indication information, the data packets sent in the first transmission mode. However, embodiments described herein are not limited thereto.

In another implementation, the second information indicates indexes of two MBS data packets, where one of the indexes of the two MBS data packets is an index of an initial data packet in the data packets sent in the first transmission mode, and the other is an index of an end data packet in the data packets sent in the first transmission mode.

For example, in response to the second information indicating a data packet whose index is 25 and a data packet whose index is 50 in the MBS data packets, the CU indicates the DU to send, in the first transmission mode, data packets from the data packet whose index is 25 to the data packet whose index is 50 in the MBS data packets. During specific implementation, whether the data packets sent in the first transmission mode include the data packets corresponding to the indexes indicated by the second information is specified. This is not limited In at least one embodiment.

Optionally, the first indication information is transferred through an F1 interface between the CU and the DU. Optionally, the F1 interface is a control plane interface, namely, F1-C, or the F1 interface is a user plane interface, namely, F1-U.

In an implementation, the first indication information is carried in a header of the MBS data packet.

For example, the header of the MBS data packet includes a bit field that carries the first indication information, and after receiving the MBS data packet from the CU, the DU determines, based on the first indication information in the header, the transmission mode used to send the data packet. Optionally, the first indication information includes first information, and the first information indicates one or more terminal devices. The DU determines, based on the first information, to send the data packet to the one or more terminal devices in the first transmission mode. Optionally, the first indication information includes second information. The DU determines, based on the second information, a plurality of MBS data packets sent in the first transmission mode. However, embodiments described herein are not limited thereto.

In another implementation, the first indication information is carried in a GPRS tunneling protocol-user plane (GPRS tunneling protocol-user plane, GTP-U) header corresponding to the MBS data packet or a header of a tunneling protocol data packet on the F1 interface. After receiving the data packet, the DU determines, based on the indication information in the header corresponding to the data packet, a specific transmission mode used to transmit the data packet.

In another implementation, the first indication information is carried in a dedicated data packet or interface control signaling between the CU and the DU. The dedicated data packet is used to carry the indication information, and is a control protocol data unit PDU (protocol data unit, PDU). In addition, the interface control signaling is F1-U signaling or F1-C signaling.

Figure 4:
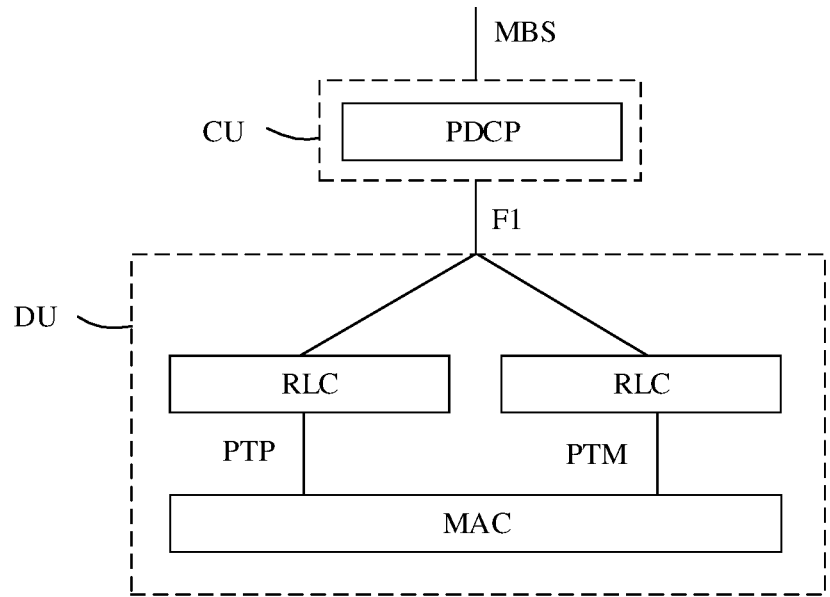
FIG. 4 is a schematic diagram of a protocol stack applicable to at least one embodiment.

Optionally, the MBS data packet is transmitted by the CU to the DU through the F1-U interface between the CU and the DU that are shared by the plurality of terminal devices. For example, in a network architecture shown in FIG. 4, in the figure, two RLC entities are respectively responsible for a data packet transmitted in the PTP transmission mode and a data packet transmitted in the PTM transmission mode. In response to determining to transmit the data packet in the PTP transmission mode, the DU places the data packet in the RLC entity corresponding to the PTP transmission mode, or on the contrary, places the data packet in the RLC entity corresponding to the PTM transmission mode.

Optionally, a network architecture applicable to at least one embodiment is alternatively as follows: An RLC entity is responsible for both a data packet transmitted in the PTP transmission mode and a data packet transmitted in a PTM transmission mode. In response to determining to transmit the data packet in the PTP transmission mode, the DU transmits the data packet in the RLC entity to the terminal device in the PTP transmission mode, or on the contrary, transmits the data packet in the RLC entity to the terminal device in the PTM transmission mode.

The DU determines, based on the first indication information from the CU, to send the MBS data packet in the first transmission mode, and performs S330.

S330: The DU sends the MBS data packet in the first transmission mode.

Correspondingly, the terminal device receives the MBS data packet. In response to the first transmission mode being the PTP transmission mode, the DU separately sends the MBS data packet to each target terminal device, and the target terminal device receives the MBS data packet sent by the DU to the target terminal device. The target terminal device is a terminal device that receives the MBS data packet and that corresponds to the PTP transmission mode. In response to the first transmission mode being the PTM transmission mode, the DU sends the MBS data packet, and a plurality of target terminal devices receive the MB S data packet. The plurality of target terminal devices are a plurality of terminal devices that receive the MBS data packet and that correspond to the PTM transmission mode.

Optionally, the terminal device sends third indication information to the access network device, where the third indication information indicates that the MBS data packet is successfully received or fails to be received. The third indication information is also referred to as data packet receiving status feedback information.

For example, the terminal device receives the data packet from the DU in S330, and in response to the terminal device successfully receiving the MBS data packet (for example, after receiving the data packet, the terminal device successfully decodes the data packet to obtain data in the data packet, but embodiments described herein are not limited thereto), the third indication information sent by the terminal device to the access network device indicates that the MBS data packet is successfully received. In response to the terminal device failing to receive the MBS data packet (for example, after receiving the data packet, the terminal device fails to decode the data packet to obtain data in the data packet, but embodiments described herein are not limited thereto), the third indication information sent by the terminal device to the access network device indicates that the MBS data packet fails to be received.

By way of example but not limitation, the third indication information is carried in a PDCP status report, or the third indication information is carried in an RLC status report.

Optionally, in response to learning that the transmission mode of the MBS data packet changes, the terminal device sends the third indication information to the access network device.

In an implementation, a network device sends second indication information to the terminal device, where the second indication information indicates that the transmission mode of the MBS data packet changes.

Correspondingly, the terminal device receives the second indication information from the network device, and determines, based on the second indication information, that the transmission mode of the MBS data packet changes.

Optionally, the second indication information is an RRC message (for example, an RRC reconfiguration message), a media access control element (media access control control element, MAC CE), downlink control information (downlink control information, DCI), a PDCP control PDU, or an RLC control PDU.

In another implementation, the terminal device determines, based on a first radio network temporary identifier (radio network temporary identifier, RNTI), whether the transmission mode of the MBS data packet changes. The first RNTI is used to schedule a data packet of a first service. Specifically, the first RNTI is an RNTI used to scramble scheduling information corresponding to the MBS data packet. The DU scrambles, by using the first RNTI, the scheduling information corresponding to the MBS data packet. Correspondingly, the terminal device descrambles the MBS data packet by using the first RNTI, to obtain the scheduling information.

For example, the terminal device receives the MBS data packet from the DU in S330, and the DU scrambles, by using the first RNTI, scheduling information corresponding to the data packet. The terminal device compares the first RNTI with a second RNTI, where the second RNTI is an RNTI used by scheduling information corresponding to a last received MBS data packet. In response to the first RNTI being different from the second RNTI, the transmission mode of the MBS data packet changes. In other words, the terminal device descrambles the scheduling information by using a different RNTI. in response to the descrambling succeeding, the terminal device determines an RNTI used by the current scheduling information, determines, based on the RNTI, a transmission mode used for a current data packet, and further determine whether the transmission mode changes. For example, in response to the DU using the PTP transmission mode, an RNTI used by the scheduling information corresponding to the MBS data packet is a cell temporary identifier (cell-RNTI, C-RNTI) of the terminal device. In response to the DU using the PTM transmission mode, an RNTI used by the scheduling information corresponding to the MBS data packet is a common RNTI. In response to the scheduling information of the MBS data packet received by the terminal device using the C-RNTI, and scheduling information of the last received MBS data packet received uses the common RNTI, the terminal device determines that the transmission mode of the MBS data packet changes. However, embodiments described herein are not limited thereto.

Optionally, in response to determining that the MBS data packet failing to be received, the terminal device sends the third indication information, where the third indication information indicates that the MBS data packet fails to be received.

Optionally, the third indication information includes an index (or an SN or an ID) of the MBS data packet that fails to be received, or includes an index (or an SN or an ID) of the MBS data packet that is successfully received.

For example, in response to determining that a data packet whose index is 1 and a data packet whose index is 3 in the MBS data packets being received, but a data packet whose index is 2 is not received, the terminal device determines that the data packet whose index is 2 in the MBS data packets fails to be received. In this case, the terminal device sends the third indication information, or the terminal device first starts a timer, and then sends the third indication information in response to the data packet whose index is 2 not being received after the timer expires, where the third indication information includes the index 2 of the data packet, and indicates that the terminal device fails to receive the MBS data packet whose index is 2. Alternatively, the third indication information includes indexes 1 and 3, and indicates that the terminal device successfully receives the MBS data packets whose indexes are 1 and 3. After receiving the third indication information, the network device determines that the terminal device successfully receives the MBS data packets whose indexes are 1 and 3, but fails to receive the MBS data packet whose index is 2.

Optionally, after sending the third indication information, the terminal device cannot trigger feedback within a first time interval, to avoid frequently sending the feedback and causing a resource waste.

For example, after sending the third indication information, the terminal device starts a clock machine (or referred to as a timer) or a counter. A running time of the clock machine or the counter is the first time interval. During running of the clock machine or the counter, the terminal device cannot send the third indication information to the network device. However, embodiments described herein are not limited thereto.

According to the foregoing solution, the CU dynamically switches the transmission mode of the MBS data packet based on an actual status of the terminal device, so that reliability of transmitting the MBS data is improved.

Figure 5:
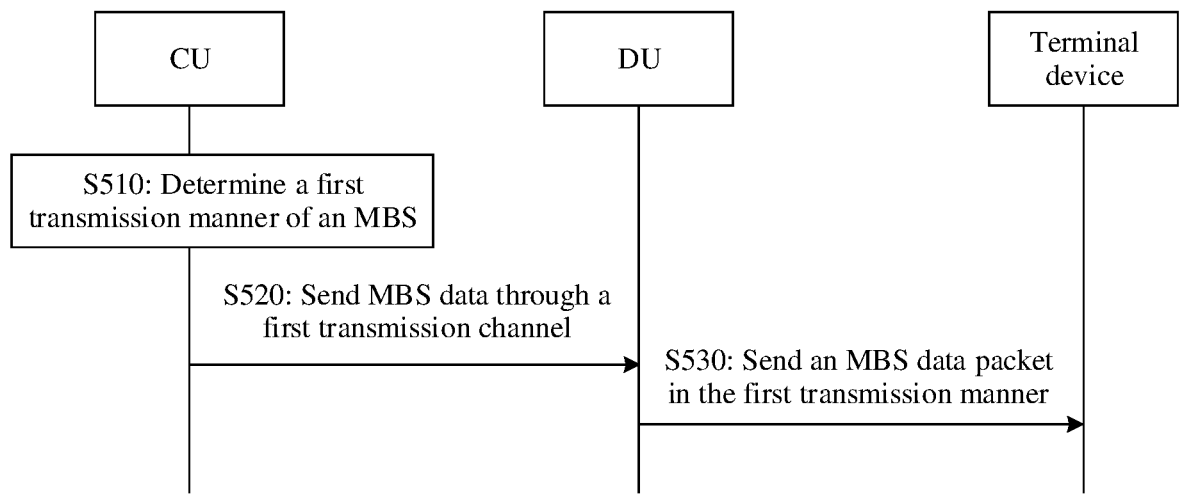
FIG. 5 is another schematic flowchart of a communication method according to at least one embodiment.

FIG. 5 is another schematic flowchart of a communication method according to at least one embodiment.

For a part that is in the embodiment shown in FIG. 5 and that is the same as or similar to that in the embodiment shown in FIG. 3, in response to the part being defined or described additionally, refer to the description in the embodiment in FIG. 3. For brevity, details are not described herein again.

S510: A CU determines a first transmission mode of an MBS, where the first transmission mode is a transmission mode used by a DU to send an MBS data packet to a terminal device.

The first transmission mode is a point-to-point PTP transmission mode or a point-to-multipoint PTM transmission mode. In other words, the CU determines whether the PTM transmission mode or the PTP transmission mode is used to send the MBS data packet to the terminal device.

Optionally, the CU determines the first transmission mode based on the foregoing first assistance information or the foregoing second assistance information.

S520: The CU sends MBS data packet to the DU through a first transmission channel.

Correspondingly, the DU receives the MBS data from the CU through the first transmission channel.

The first transmission channel is a transmission channel established between the CU and the DU, and is also referred to as a first tunnel. In response to the first transmission mode being the point-to-point transmission mode, the first tunnel corresponds to one terminal device. For example, the first transmission channel is referred to as a dedicated tunnel corresponding to the terminal device. In response to the first transmission mode being the point-to-multipoint transmission mode, the first tunnel corresponds to a plurality of terminal devices. For example, the first transmission channel is referred to as a shared tunnel corresponding to the plurality of terminal devices.

Figure 6:
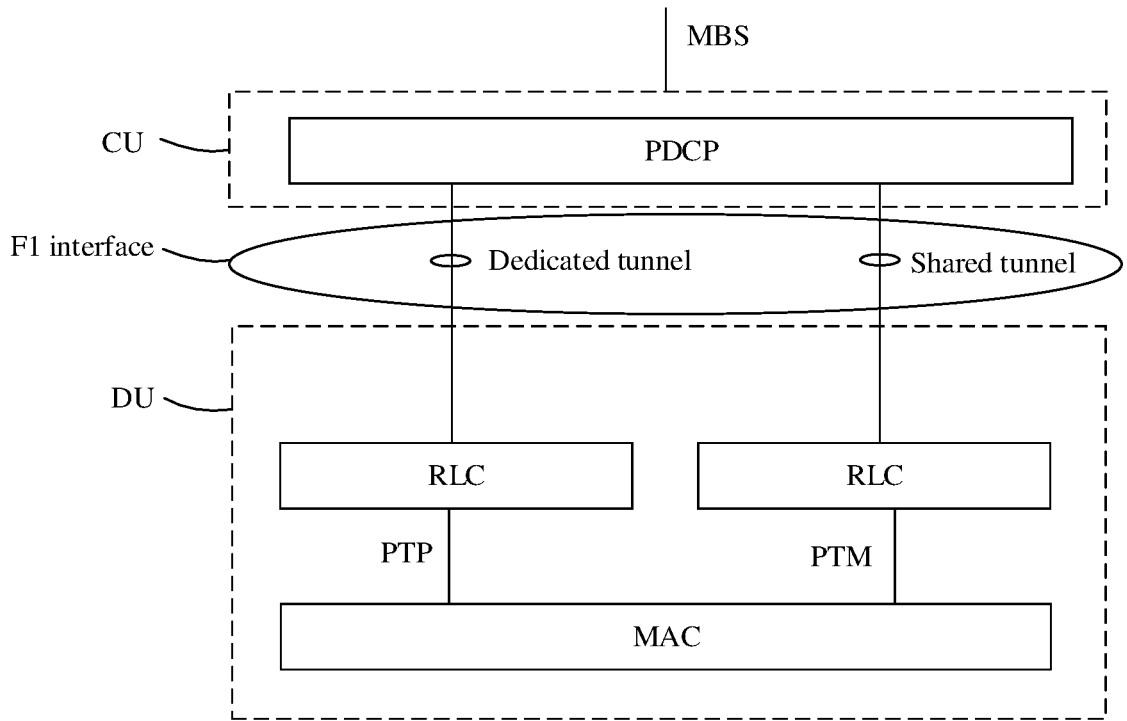
FIG. 6 is a schematic diagram of tunnels on an interface between a CU and a DU according to at least one embodiment.

As shown in FIG. 6, a PTP dedicated tunnel in a one-to-one correspondence with each terminal device and a shared tunnel corresponding to a plurality of terminal devices are established on an interface between the CU and the DU. In response to determining that the DU sends the MBS data packet to a terminal device A in the PTP transmission mode, the CU sends the MBS data to the DU through the PTP dedicated tunnel (where, to be specific, the first tunnel is the PTP dedicated tunnel) corresponding to the terminal device A in S520. In response to the CU determining that the DU sends the MBS data packet to the plurality of terminal devices in the PTM transmission mode, the CU sends the MBS data to the DU through the shared tunnel (where, to be specific, the first tunnel is the shared tunnel) in S520. Correspondingly, in S520, in response to receiving the MBS data packet from the CU through the PTP dedicated tunnel corresponding to the terminal device A, the DU determines that the MBS data received through the PTP dedicated tunnel is to be sent to the terminal device A in the PTP transmission mode. Specifically, the DU forms the MBS data packet by using the MBS data received through the PTP dedicated tunnel, and send the MBS data packet to the terminal device A in the PTP transmission mode. in response to receiving the MBS data from the CU through the PTM shared tunnel, the DU determines that the MBS data received through the PTM shared tunnel is to be sent in the PTM transmission mode. Specifically, the DU forms the MBS data packet by using the MBS data received through the PTM shared tunnel, and send the MBS data packet in the PTM transmission mode.

Figure 7:
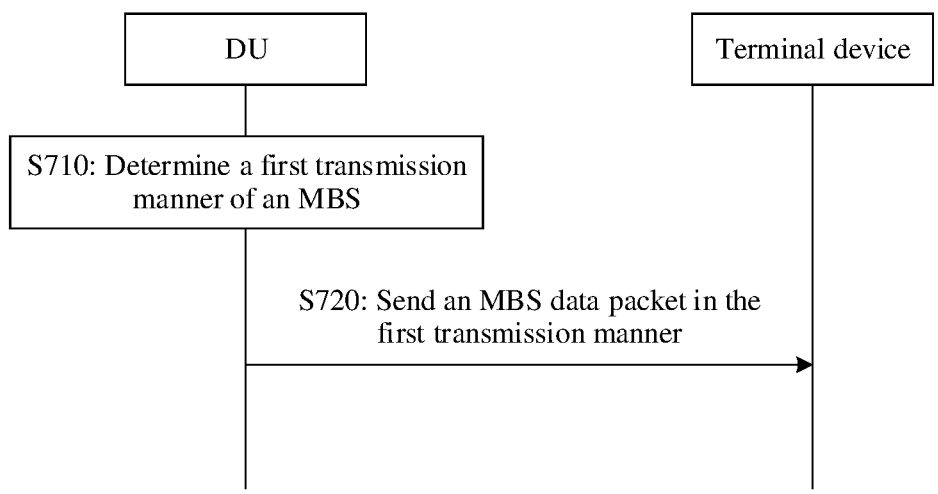
FIG. 7 is another schematic flowchart of a communication method according to at least one embodiment.

S530: The DU sends the MBS data packet to the terminal device in the first transmission mode. Two RLC entities in FIG. 7 are alternatively replaced with a same RLC entity. In this case, the data packets through the PTP tunnel and the shared tunnel are placed in the same RLC entity, and the DU then determines a specific transmission mode used for the data packets in the RLC entity.

Correspondingly, the terminal device receives the MBS data packet from the DU. For a specific implementation of S530, refer to the description of S330 in FIG. 3. For brevity, details are not described herein again.

Based on the foregoing solution, after determining, based on an actual status of the terminal device, the transmission mode used by the DU to send the MBS data packet to the terminal device, the CU transmits the data packet to the DU through the transmission channel corresponding to the determined transmission mode, and the DU determines, through the transmission channel, the transmission mode used to send the MBS data packet to the terminal device, so that the access network dynamically switches the transmission mode of the MBS data packet based on the actual status of the terminal device. This improves reliability of transmitting the MBS data.

Optionally, the embodiment in FIG. 3 and the embodiment in FIG. 5 is implemented in combination with each other. For example, after determining the first transmission mode of the MBS, the CU sends first indication information and the MBS data to the DU through the first transmission channel. However, embodiments described herein are not limited thereto.

FIG. 7 is another schematic flowchart of a communication method according to at least one embodiment.

It should be noted that, for a part that is in the embodiment shown in FIG. 7 and that is the same as or similar to that in the embodiment shown in FIG. 3, in response to the part being defined or described additionally, refer to the description in the embodiment in FIG. 3. For brevity, details are not described herein again.

S710: A DU determines a first transmission mode of an MBS.

The first transmission mode is a point-to-point PTP transmission mode or a point-to-multipoint PTM transmission mode. In other words, the DU determines whether the PTM transmission mode or the PTP transmission mode is used to send the MBS data packet to the terminal device.

Optionally, the DU determines the first transmission mode based on assistance information. The assistance information includes but is not limited to one or more of the following:

1. Measurement Report of the Terminal Device

For example, the measurement report of the terminal device includes channel state information (channel state information, CSI). The terminal device measures a reference signal sent by an access network device to obtain the CSI, and feeds back the CSI to the access network device. The DU determines, based on obtained CSI fed back by M terminal devices that receive the MBS data packet, the transmission mode used to send the MBS data packet. For example, in response to CSI fed back by N terminal devices in the M terminal devices indicating better channel quality (where, for example, the better channel quality is that the CSI is higher than a preset threshold, but embodiments described herein are not limited thereto), the DU determines to send the MBS data packet to the N terminal devices in the PTM transmission mode (where, to be specific, the first transmission mode is the PTM transmission mode), to save air interface resources, where $0 \leq N \leq M$. In response to CSI fed back by L terminal devices in the M terminal devices indicating poorer channel quality, to ensure transmission reliability, the DU determines to separately send the MBS data packet to the L terminal devices in the PTP transmission mode (where, to be specific, the first transmission mode is the PTP transmission mode), where $0 \leq L \leq M$. However, embodiments described herein are not limited thereto.

2. Beam Information of the Terminal Device

For example, the terminal device sends the beam information of the terminal device to an access network device, which is specifically information about a receive beam of the terminal device. The DU obtains beam information reported by M terminal devices that receive the MB S data packet, where receive beams of N terminal devices in the M terminal devices is covered by one downlink beam. The DU determines to send the MBS data packet to the N terminal devices in the PTM transmission mode (where, to be specific, the first transmission mode is the PTM transmission mode), to save air interface resources. However, in response to L terminal devices in the M terminal devices not being covered by a common downlink beam with another terminal device, the DU determines to separately send the MBS data packet to the L terminal devices in the PTP transmission mode (where, to be specific, the first transmission mode is the PTP transmission mode), to improve reliability of the MBS. However, embodiments described herein are not limited thereto.

3. Location Information of the Terminal Device

For example, the DU performs area division based on location information of a plurality of terminal devices, and determines to send the MBS data packet to a plurality of terminal devices in a same area in the PTM transmission mode (where, to be specific, the first transmission mode is the PTM transmission mode). In response to an area including only one terminal device, the DU determines to send the MBS data packet to the terminal device in the PTP transmission mode (where, to be specific, the first transmission mode is the PTP transmission mode). However, embodiments described herein are not limited thereto.

For another example, the DU sends the MBS data packet to a terminal device at a cell edge in the PTP transmission mode (where, to be specific, the first transmission mode is the PTP transmission mode), to improve reliability of the MBS. However, embodiments described herein are not limited thereto.

4. Indication information B from the terminal device, where the indication information B indicates whether the terminal device intends to receive the MBS data packet.

In other words, the indication information B indicates information indicating whether the terminal device is interested in the MBS service. In response to the indication information A indicating information indicating that the terminal device is interested in the MBS, the terminal device intends to receive the MBS data packet. In response to the indication information A indicating information indicating that the terminal device is not interested in the MBS, the terminal device does not intend to receive the MB S data packet.

For example, the terminal device sends the indication information B to an access network device. After obtaining the indication information B from the terminal device, the DU determines, depending on whether the terminal device receives the MBS data packet, the transmission mode used to send the MBS. For example, in response to a plurality of terminal devices intending to receive the MBS data packet, the DU determines to send the MBS data packet to the plurality of terminal devices in the PTM transmission mode (where, to be specific, the first transmission mode is the PTM transmission mode). For example, in response to only one terminal device in a coverage range intending to receive the MBS data packet, the DU determines to send the MBS data packet to the terminal device in the PTP transmission mode (where, to be specific, the first transmission mode is the PTP transmission mode). However, embodiments described herein are not limited thereto.

5. Third indication information from the terminal device, where the third indication information indicates whether the MBS data packet sent by an access network device is successfully received. The third indication information is also referred to as data packet receiving status feedback information.

For example, the terminal device sends, to the DU, whether the MBS data packet sent by the access network device (for example, sent by the DU in an access network) is successfully received. In response to the terminal device failing to receive a data packet, the data packet is resent to the terminal device in the PTP transmission mode (where, to be specific, the first transmission mode is the PTP transmission mode). Alternatively, in response to determining, based on the third indication information, that a quantity of MBS data packets that the terminal device fails to receive is greater than or equal to a preset threshold, the DU determines to transmit subsequent to-be-transmitted MBS data packets in the PTP transmission mode, to improve reliability of transmitting the MBS data packet. However, embodiments described herein are not limited thereto.

Optionally, the third indication information is carried in an RLC status report sent by the terminal device.

Optionally, the DU determines the first transmission mode of the MBS based on assistance information from a core network. The assistance information includes information indicating whether the terminal device is interested in the MBS or the location information of the terminal device.

In an implementation, the terminal device reports, to a core network device, the location information of the terminal and indication information indicating whether the terminal is interested in the MB S service, so that the core network knows a status of the terminal device better. Therefore, the core network sends the foregoing two types of information to the DU as assistance information, for reference by the DU during decision-making. Alternatively, optionally, after making, based on the foregoing information, a decision on the transmission mode in which the DU transmits the MBS data packet, the core network sends a decision result to the DU.

Optionally, the assistance information is information at an RLC layer or information at a protocol layer below the RLC layer.

For example, the assistance information includes CSI of the terminal device, and the CSI of the terminal device is CSI obtained by a physical layer in the DU.

S720: The DU sends an MBS data packet in the first transmission mode.

Correspondingly, the terminal device receives the MBS data packet from the DU. In response to the first transmission mode being the PTP transmission mode, the DU separately sends the MBS data packet to each target terminal device, and the target terminal device receives the MBS data packet sent by the DU to the target terminal device. The target terminal device is a terminal device that receives the MBS data packet and that corresponds to the PTP transmission mode. In response to the first transmission mode being the PTM transmission mode, the DU sends the MBS data packet, and a plurality of target terminal devices receive the MBS data packet. The plurality of target terminals are a plurality of terminal devices that receive the MBS data packet and that correspond to the PTM transmission mode.

Optionally, the terminal device sends third indication information to the access network device, where the third indication information indicates that the MBS data packet is successfully received or fails to be received.

In an implementation, in response to the transmission mode of the MBS data packet changing, the terminal device sends the third indication information to the access network device.

In another implementation, in response to determining that the MBS data packet fails to be received, the terminal device sends the third indication information, where the third indication information indicates that the MBS data packet fails to be received. The third indication information is referred to as data packet receiving status feedback information.

Optionally, the third indication information includes an index (or an SN or an ID) of the MBS data packet that fails to be received, or includes an index (or an SN or an ID) of the MBS data packet that is successfully received.

Optionally, after sending the third indication information, the terminal device cannot trigger feedback within a first time interval.

According to the foregoing solution, the DU dynamically switches the transmission mode of the MBS data packet based on an actual status of the terminal device, so that reliability of transmitting the MBS data is improved.

The embodiment shown in FIG. 3 and the embodiment shown in FIG. 5 is implemented in combination with each other.

For example, before sending the MBS data packet, the DU determines whether an indication from the CU is received. In response to receiving the indication from the CU, the DU determines, based on the indication from the CU, the transmission mode for transmitting the MBS data packet. The indication from the CU indicates the transmission mode that is used by the DU to transmit the MBS data packet and that is indicated by the CU to the DU. in response to the CU indicating the DU to transmit the MBS data packet in the first transmission mode, the DU transmits the MBS data packet in the first transmission mode based on the indication from the CU. However, embodiments described herein are not limited thereto.

For another example, the DU compares a priority of a first determining manner with a priority of a second determining manner, and determines, based on a determining manner with a higher priority, the transmission mode for transmitting the MBS data packet. In the first determining manner, the DU determines the transmission mode of the MBS based on the assistance information from the terminal device, and in the second determining manner, the DU determines the transmission mode of the MBS based on the indication from the CU. In response to the priority of the first determining manner being higher than the priority of the second determining manner, the DU determines the transmission mode of the MBS based on the assistance information from the terminal device. In response to the priority of the first determining manner being lower than the priority of the second determining manner, the DU determines the transmission mode of the MBS based on the indication from the CU.

According to the foregoing solution, the access network dynamically switches the transmission mode of the MBS data packet based on the actual status of the terminal device, so that reliability of transmitting the MBS data is improved.

The foregoing describes, in detail with reference to FIG. 2 to FIG. 7, the methods provided in at least one embodiment. The following describes, in detail with reference to FIG. 8 to FIG. 10, apparatuses provided in at least one embodiment.

Figure 8:
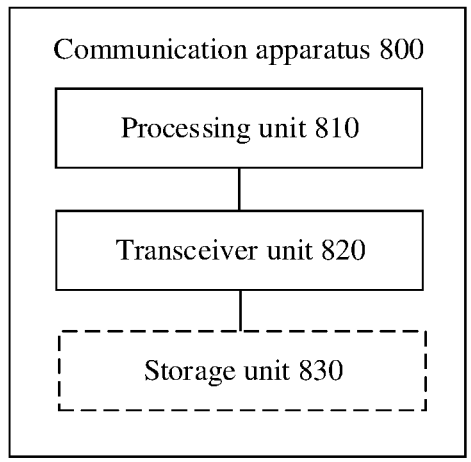
FIG. 8 is a schematic block diagram of an example of a communication apparatus according to at least one embodiment.

FIG. 8 is a schematic block diagram of a communication apparatus according to at least one embodiment. As shown in FIG. 8, the communication apparatus 800 includes a processing unit 810 and a transceiver unit 820.

In at least one embodiment, the communication apparatus 800 corresponds to the CU in the foregoing method embodiments, or a chip configured (or used) in the CU.

It should be understood that the communication apparatus 800 corresponds to the CU in the methods 300 and 500 according to at least one embodiment. The communication apparatus 800 includes units configured to perform the methods performed by the CU in the methods 300 and 500 in FIG. 3 and FIG. 5. In addition, the units in the communication apparatus 800 and the foregoing other operations and/or functions are separately used to implement corresponding procedures in the methods 300 and 500 in FIG. 3 and FIG. 5.

It should be further understood that in response to the communication apparatus 800 being the chip configured (or used) in the CU, the transceiver unit 820 in the communication apparatus 800 is an input/output interface or circuit in the chip, and the processing unit 810 in the communication apparatus 800 is a processor in the chip.

Optionally, the communication apparatus 800 further includes a processing unit 810. The processing unit 810 is configured to process instructions or data, to implement a corresponding operation.

Optionally, the communication apparatus 800 further includes a storage unit 830. The storage unit 830 is configured to store instructions or data. The processing unit 810 executes the instructions or the data stored in the storage unit, to enable the communication apparatus to implement a corresponding operation. The transceiver unit 820 in the communication apparatus 800 corresponds to a transceiver 1020 in a communication device 1000 (CU device) shown in FIG. 10, and the storage unit 830 corresponds to a memory 1030 in the CU device 1000 shown in FIG. 10.

A specific process in which the units perform the foregoing corresponding steps is described in detail in the foregoing method embodiments. For brevity, details are not described herein again.

Figure 10:
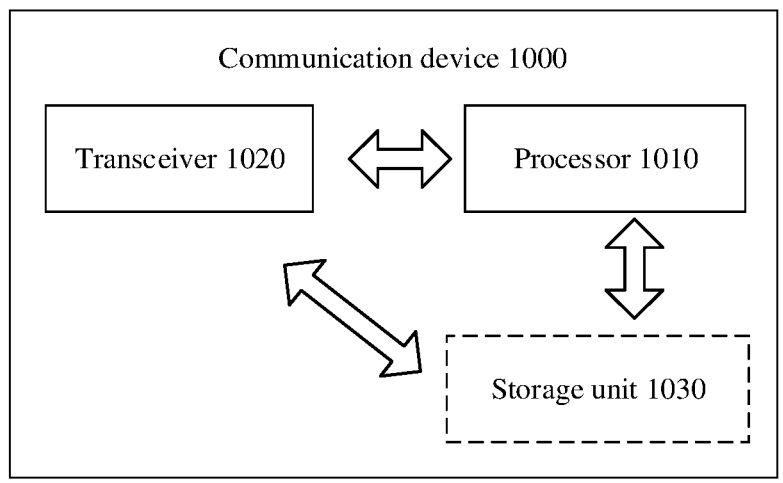
FIG. 10 is a schematic diagram of a structure of an example of a communication device according to at least one embodiment.

In response to the communication apparatus 800 being the CU, the transceiver unit 820 in the communication apparatus 800 is implemented by using a communication interface (for example, the transceiver or the input/output interface), for example, corresponds to the transceiver 1020 in the communication device 1000 (namely, the CU device) shown in FIG. 10. Optionally, the processing unit 810 in the communication apparatus 800 is implemented by using at least one logic circuit.

In at least one embodiment, the communication apparatus 800 corresponds to the DU in the foregoing method embodiments, or a chip configured (or used) in the DU.

The communication apparatus 800 corresponds to the DU in the methods 300, 500, and 700 according to at least one embodiment. The communication apparatus 800 includes units configured to perform the methods performed by the DU in the methods 300, 500, and 700 in FIG. 3, FIG. 5, and FIG. 7. In addition, the units in the communication apparatus 800 and the foregoing other operations and/or functions are separately used to implement corresponding procedures in the methods 300, 500, and 700 in FIG. 3, FIG. 5, and FIG. 7.

In response to the communication apparatus 800 being the chip configured (or used) in the DU, the transceiver unit 820 in the communication apparatus 800 is an input/output interface or circuit in the chip, and the processing unit 810 in the communication apparatus 800 is a processor in the chip.

Optionally, the communication apparatus 800 further includes a processing unit 810. The processing unit 810 is configured to process instructions or data, to implement a corresponding operation.

Optionally, the communication apparatus 800 further includes a storage unit 830. The storage unit 830 is configured to store instructions or data. The processing unit 810 executes the instructions or the data stored in the storage unit, to enable the communication apparatus to implement a corresponding operation. The transceiver unit 820 in the communication apparatus 800 corresponds to a transceiver 1020 in a communication device 1000 (namely, DU device) shown in FIG. 10, and the storage unit 830 corresponds to a memory 1030 in the DU device 1000 shown in FIG. 10.

A specific process in which the units perform the foregoing corresponding steps is described in detail in the foregoing method embodiments. For brevity, details are not described herein again.

In response to the communication apparatus 800 being the DU, the transceiver unit 820 in the communication apparatus 800 is implemented by using a communication interface (for example, the transceiver or the input/output interface), for example, corresponds to the transceiver 1020 in the communication device 1000 (namely, the DU device) shown in FIG. 10. Optionally, the processing unit 810 in the communication apparatus 800 is implemented by using at least one logic circuit.

In at least one embodiment, the communication apparatus 800 corresponds to the terminal device in the foregoing method embodiments, or a chip configured (or used) in the terminal device.

The communication apparatus 800 corresponds to the terminal device in the methods 300, 500, and 700 according to at least one embodiment. The communication apparatus 800 includes units configured to perform the methods performed by the DU in the methods 300, 500, and 700 in FIG. 3, FIG. 5, and FIG. 7. In addition, the units in the communication apparatus 800 and the foregoing other operations and/or functions are separately used to implement corresponding procedures in the methods 300, 500, and 700 in FIG. 3, FIG. 5, and FIG. 7.

In response to the communication apparatus 800 being the chip configured (or used) in the CU, the transceiver unit 820 in the communication apparatus 800 is an input/output interface or circuit in the chip, and the processing unit 810 in the communication apparatus 800 is a processor in the chip.

Optionally, the communication apparatus 800 further includes a processing unit 810. The processing unit 810 is configured to process instructions or data, to implement a corresponding operation.

Optionally, the communication apparatus 800 further includes a storage unit 830. The storage unit 830 is configured to store instructions or data. The processing unit 810 executes the instructions or the data stored in the storage unit, to enable the communication apparatus to implement a corresponding operation. The transceiver unit 820 in the communication apparatus 800 corresponds to a transceiver 1610 in a terminal device 1600 shown in FIG. 9, and the storage unit 830 corresponds to a memory in the terminal device 1600 shown in FIG. 9.

A specific process in which the units perform the foregoing corresponding steps is described in detail in the foregoing method embodiments. For brevity, details are not described herein again.

In response to the communication apparatus 800 being the terminal device, the transceiver unit 820 in the communication apparatus 800 is implemented by using a communication interface (for example, the transceiver or the input/output interface), for example, corresponds to the transceiver 1020 in the communication device 1600 shown in FIG. 10. Optionally, the processing unit 810 in the communication apparatus 800 is implemented by using at least one logic circuit.

Figure 9:
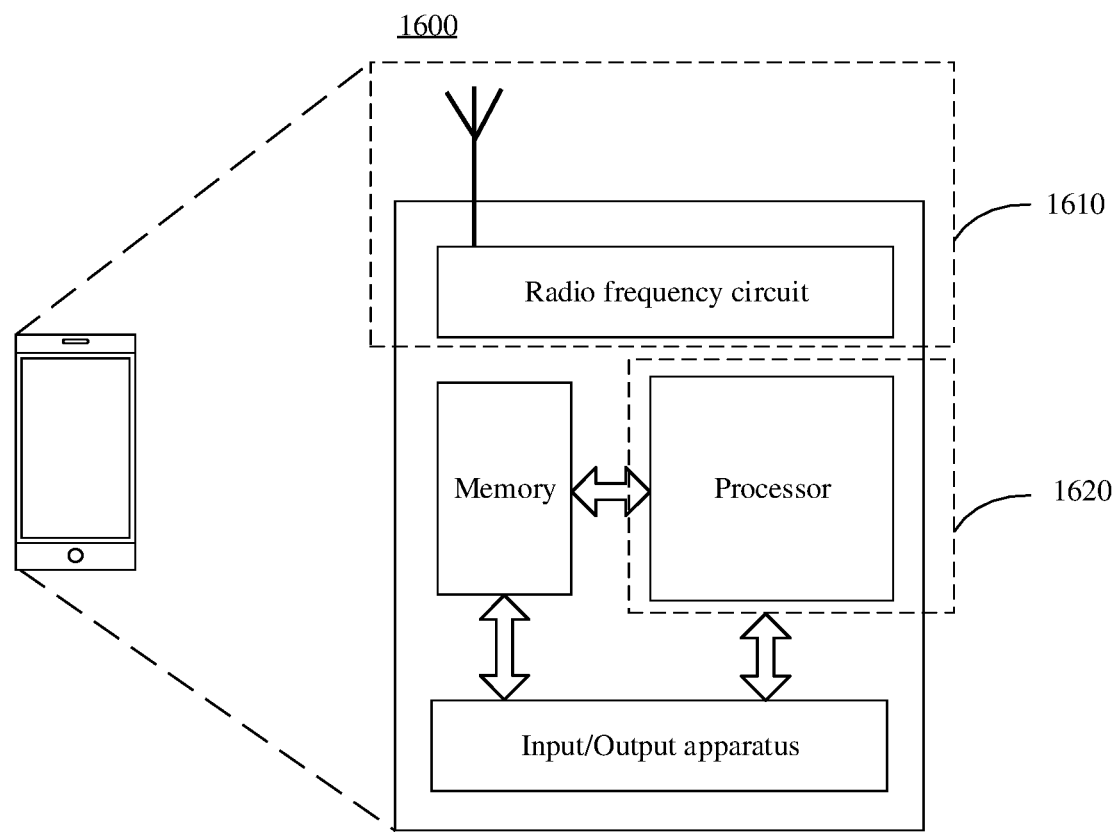
FIG. 9 is a schematic diagram of a structure of an example of a terminal device according to at least one embodiment.

FIG. 9 is a schematic diagram of a structure of a terminal device 1600 according to at least one embodiment. The terminal device 1600 is used in the system shown in FIG. 1, to perform functions of the terminal device in the foregoing method embodiments. As shown in the figure, the terminal device 1600 includes a processor 1620 and a transceiver 1610. Optionally, the terminal device 1600 further includes a memory. The processor 1620, the transceiver 1610, and the memory communicate with each other through an internal connection path, to transfer a control signal and/or a data signal. The memory is configured to store a computer program. The processor 1620 is configured to execute the computer program in the memory, to control the transceiver 1610 to receive and send a signal.

The processor 1620 and the memory is integrated into a processing apparatus, and the processor 1620 is configured to execute program code stored in the memory to implement the foregoing functions. During specific implementation, the memory is combined into the processor 1620, or independent of the processor 1620. The processor 1620 corresponds to the processing unit in FIG. 6.

The transceiver 1610 corresponds to the transceiver unit in FIG. 6. The transceiver 1610 includes a receiver (or referred to as a receiver machine or a receiver circuit) and a transmitter (or referred to as a transmitter machine or a transmitter circuit). The receiver is configured to receive a signal, and the transmitter is configured to transmit a signal.

Optionally, the terminal device 1600 further includes a power supply, configured to supply power to various components or circuits of the terminal device.

In addition, to make functions of the terminal device more perfect, the terminal device 1600 further includes one or more of an input unit, a display unit, an audio circuit, a camera, a sensor, and the like, and the audio circuit further includes a speaker, a microphone, and the like.

FIG. 10 is a schematic diagram of a structure of a communication device according to at least one embodiment. The communication device 1000 is used in the system shown in FIG. 1, to perform functions of the network device in the foregoing method embodiments. For example, FIG. 10 is a schematic diagram of a related structure of the network device.

The communication device 1000 shown in FIG. 10 implements each process of the CU device or the DU device in the foregoing method embodiments. Operations and/or functions of modules in the communication device 1000 are separately intended to implement corresponding procedures in the foregoing method embodiments. For details, refer to the descriptions in the foregoing method embodiments. To avoid repetition, detailed descriptions are properly omitted herein.

At least one embodiment further provides a processing apparatus, including a processor and an interface. The processor is configured to perform the method according to any one of the foregoing method embodiments.

The processing apparatus is one or more chips. For example, the processing apparatus is a field programmable gate array (field programmable gate array, FPGA), an application-specific integrated circuit (application-specific integrated circuit, ASIC), a system on chip (system on chip, SoC), a central processing unit (central processing unit, CPU), a network processor (network processor, NP), a digital signal processor (digital signal processor, DSP), a microcontroller unit (microcontroller unit, MCU), a programmable logic device (programmable logic device, PLD), or another integrated chip.

During implementation, steps in the foregoing methods is completed by using a hardware integrated logical circuit in the processor or instructions in a form of software. The steps in the methods disclosed with reference to at least one embodiment is directly performed and completed by using a hardware processor, or is performed and completed by using a combination of hardware and software modules in the processor. The software module is located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with the hardware of the processor. To avoid repetition, details are not described herein again.

It should be noted that the processor in at least one embodiment is an integrated circuit chip, and has a signal processing capability. During implementation, steps in the foregoing method embodiments is completed by using a hardware integrated logical circuit in the processor or instructions in a form of software. The processor is a general-purpose processor, a digital signal processor (DSP), an application-specific integrated circuit (ASIC), a field programmable gate array (FPGA) or another programmable logic device, a discrete gate or a transistor logic device, or a discrete hardware component. The processor implements or performs the methods, the steps, and logical block diagrams that are disclosed in at least one embodiment. The general-purpose processor is a microprocessor, or the processor is any conventional processor, or the like. The steps in the methods disclosed with reference to at least one embodiment is directly performed and completed by using a hardware decoding processor, or is performed and completed by using a combination of hardware and software modules in the decoding processor. The software module is located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with the hardware of the processor.

The memory in at least one embodiment is a volatile memory or a nonvolatile memory, or includes both a volatile memory and a nonvolatile memory. The nonvolatile memory is a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory is a random access memory (random access memory, RAM), used as an external cache. By way of example, and not limitation, many forms of RAMs are available, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory in the systems and methods described in this specification includes but is not limited to these memories and any memory of another proper type.

According to the methods provided in at least one embodiment, a computer program product is provided. The computer program product includes computer program code. In response to the computer program code being executed by one or more processors, an apparatus including the processor is enabled to perform the method in the embodiment shown in FIG. 2.

According to the methods provided in at least one embodiment, a computer-readable storage medium is provided. The computer-readable storage medium stores program code. In response to the program code being executed by one or more processors, an apparatus including the processor is enabled to perform the method in the embodiment shown in FIG. 2.

According to the methods provided in at least one embodiment, a system is provided, including the foregoing one or more network devices. The system further includes the foregoing one or more terminal devices.

The network device and the terminal device in the foregoing apparatus embodiments completely correspond to the network device and the terminal device in the method embodiments. A corresponding module or unit performs a corresponding step. For example, the communication unit (the transceiver) performs a receiving or sending step in the method embodiments, and a step other than the sending or receiving step is performed by the processing unit (the processor). For a function of a specific unit, refer to a corresponding method embodiment. There is one or more processors.

All or some of the foregoing embodiments is implemented by software, hardware, firmware, or any combination thereof. In response to software being used to implement embodiments, all or some of embodiments is implemented in a form of a computer program product. The computer program product includes one or more computer instructions. In response to the computer instructions being loaded and executed on a computer, the procedures or functions according to the at least one embodiment are all or partially generated. The computer is a general-purpose computer, a dedicated computer, a computer network, or another programmable apparatus. The computer instructions is stored in a computer-readable storage medium or is transmitted from a computer-readable storage medium to another computer-readable storage medium. For example, the computer instructions is transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium is any usable medium accessible by the computer, or a data storage device, for example, a server or a data center, integrating one or more usable media. The usable medium is a magnetic medium (for example, a floppy disk, a hard disk, or a magnetic tape), an optical medium (for example, a high-density digital video disc (digital video disc, DVD)), a semiconductor medium (for example, a solid-state drive (solid-state disc, SSD)), or the like.

The network device and the terminal device in the foregoing apparatus embodiments completely correspond to the network device and the terminal device in the method embodiments. A corresponding module or unit performs a corresponding step. For example, the communication unit (the transceiver) performs a receiving or sending step in the method embodiments, and a step other than the sending or receiving step is performed by the processing unit (the processor). For a function of a specific unit, refer to a corresponding method embodiment. There is one or more processors.

Terms such as "component", "module", and "system" used in this specification are used to indicate computer-related entities, hardware, firmware, combinations of hardware and software, software, or software being executed. For example, a component is, but is not limited to, a process that runs on a processor, a processor, an object, an executable file, a thread of execution, a program, and/or a computer. As shown in figures, both a computing device and an application that runs on a computing device is components. One or more components reside within a process and/or a thread of execution, and a component is located on one computer and/or distributed between two or more computers. In addition, these components is executed from various computer-readable media that store various data structures. For example, the components communicate by using a local and/or remote process and based on a signal having one or more data packets (for example, data from two components interacting with another component in a local system, a distributed system, and/or across a network such as the internet interacting with another system by using the signal).

A person of ordinary skill in the art is aware that units and algorithm steps in the examples described with reference to embodiments disclosed in this specification is implemented by electronic hardware or a combination of computer software and electronic hardware. Whether the functions are performed by hardware or software depends on particular applications and design constraint conditions of the technical solutions. A person skilled in the art is able to use different methods to implement the described functions for embodiments described herein.

A person skilled in the art that, for the purpose of convenient and brief description, for detailed working processes of the foregoing system, apparatus, and unit, refer to corresponding processes in the foregoing method embodiments. Details are not described herein again.

In the several embodiments provided. In at least one embodiment, the disclosed system, apparatus, and method is implemented in other manners. For example, the described apparatus embodiments are merely examples. For example, the unit division is merely logical function division and is other division during actual implementation. For example, a plurality of units or components is combined or integrated into another system, or some features is ignored or not performed. In addition, the displayed or discussed mutual couplings or direct couplings or communication connections is implemented through some interfaces. The indirect couplings or communication connections between the apparatuses or units is implemented in electronic, mechanical, or other forms.

The units described as separate components may or may not be physically separate, and components displayed as units may or may not be physical units, to be specific, is located in one position, or is distributed on a plurality of network units. Some or all of the units is selected based on an actual use to achieve the objectives of the solutions of embodiments.

In addition, functional units in at least one embodiment is integrated into one processing unit, each of the units exist alone physically, or two or more units is integrated into one unit.

In the foregoing embodiments, all or some of the functions of the functional units is implemented by software, hardware, firmware, or any combination thereof. In response to software being used to implement embodiments, all or some of embodiments is implemented in a form of a computer program product. The computer program product includes one or more computer instructions (programs). In response to the computer program instructions (programs) being loaded and executed on a computer, the procedures or functions according to the at least one embodiment are all or partially generated. The computer is a general-purpose computer, a dedicated computer, a computer network, or another programmable apparatus. The computer instructions is stored in a computer-readable storage medium or is transmitted from a computer-readable storage medium to another computer-readable storage medium. For example, the computer instructions is transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium is any usable medium accessible by the computer, or a data storage device, for example, a server or a data center, integrating one or more usable media. The usable medium is a magnetic medium (for example, a floppy disk, a hard disk, or a magnetic tape), an optical medium (for example, a DVD), a semiconductor medium (for example, a solid-state drive (solid-state drive, SSD)), or the like.

In response to the functions being implemented in a form of a software functional unit and sold or used as an independent product, the functions is stored in a computer-readable storage medium. Based on such an understanding, the technical solutions of embodiments described herein essentially, or the part contributing to the conventional technology, or some of the technical solutions is implemented in a form of a software product. The computer software product is stored in a storage medium, and includes several instructions for indicating a computer device (which is a personal computer, a server, a network device, or the like) to perform all or some of the steps in the methods described in at least one embodiment. The foregoing storage medium includes any medium that stores program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of at least one embodiment, but are not intended to limit the protection scope of at least one embodiment. Any variation or replacement readily figured out by a person skilled in the art within the technical scope disclosed In at least one embodiment shall fall within the protection scope of at least one embodiment. Therefore, the protection scope of at least one embodiment is subject to the protection scope of the claims.

What is claimed is:

1. A communication method, comprising:
   determining, by a central unit, a first transmission mode of a first service, wherein the first transmission mode is a point-to-point transmission mode or a point-to-multipoint transmission mode; and
   indicating, by the central unit, a distributed unit to transmit a first data packet of the first service in the first transmission mode.

2. The method according to claim 1, wherein the indicating, by the central unit, the distributed unit to transmit the first data packet of the first service in the first transmission mode includes:
   sending, by the central unit, first indication information to the distributed unit, wherein the first indication information indicates the distributed unit to transmit the first data packet in the first transmission mode.

3. The method according to claim 2, wherein the first indication information indicates the distributed unit to transmit the first data packet to a first terminal device in the first transmission mode.

4. The method according to claim 2, wherein the sending, by the central unit, the first indication information further includes sending the first indication information in a header corresponding to the first data packet of the first service.

5. The method according to claim 1, wherein the indicating, by the central unit, the distributed unit to transmit the first data packet of the first service in the first transmission mode includes:
   transmitting, by the central unit, the first data packet to the distributed unit through a first transmission channel, wherein
      in response to the first transmission mode being the point-to-point transmission mode, the first transmission channel corresponds to one terminal device; and
      in response to the first transmission mode being the point-to-multipoint transmission mode, the first transmission channel corresponds to a plurality of terminal devices.

6. The method according to claim 2, wherein
   the first indication information includes a bit string, and
   each bit in the bit string corresponds to a corresponding terminal device among a plurality of terminal devices, wherein
      in response to said each bit being a first logic value, the distributed unit is indicated to transmit the first data packet to the corresponding terminal device in the first transmission mode being the point-to-point transmission mode, and
      in response to said each bit being a second logic value different from the first logic value, the distributed unit is indicated to transmit the first data packet to the corresponding terminal device in the first transmission mode being the point-to-multipoint transmission mode.

7. A communication method, comprising:
   determining, by a distributed unit, whether an indication of a central unit is received; and
   in response to the distributed unit receiving the indication of the central unit, determining, by the distributed unit based on the indication of the central unit, to transmit a first data packet of a first service in a first transmission mode, wherein the first transmission mode is a point-to-point transmission mode or a point-to-multipoint transmission mode; and
   transmitting, by the distributed unit, the first data packet in the first transmission mode.

8. The method according to claim 7, wherein the method further comprises:
   in response to the distributed unit not receiving the indication of the central unit, determining, by the distributed unit to transmit the first data packet of the first service in the first transmission mode.

9. The method according to claim 7, wherein the determining, by the distributed unit based on the indication of the central unit, to transmit the first data packet of the first service in the first transmission mode includes:
   receiving, by the distributed unit, first indication information from the central unit, wherein the first indication information indicates the distributed unit to transmit the first data packet in the first transmission mode.

10. The method according to claim 9, wherein the first indication information indicates the distributed unit to transmit the first data packet to a first terminal device in the first transmission mode.

11. The method according to claim 9, wherein the receiving the first indication information further includes receiving the first indication information in a header corresponding to the first data packet of the first service.

12. The method according to claim 7, wherein the determining, by the distributed unit based on the indication of the central unit, to transmit the first data packet of the first service in the first transmission mode includes:
   receiving, by the distributed unit, the first data packet from the central unit through a first transmission channel, wherein
      in response to the first transmission channel corresponding to one terminal device, the first transmission mode is the point-to-point transmission mode; and
      in response to the first transmission channel corresponding to a plurality of terminal devices, the first transmission mode is the point-to-multipoint transmission mode.

13. The method according to claim 9, wherein
   the first indication information includes a bit string, and
   each bit in the bit string corresponds to a corresponding terminal device among a plurality of terminal devices, wherein
      in response to said each bit being a first logic value, the transmitting the first data packet in the first transmission mode comprises transmitting, by the distributed unit, the first data packet to the corresponding terminal device in the first transmission mode being the point-to-point transmission mode, and
      in response to said each bit being a second logic value different from the first logic value, the transmitting the first data packet in the first transmission mode comprises transmitting, by the distributed unit, the first data packet to the corresponding terminal device in the first transmission mode being the point-to-multipoint transmission mode.

14. An apparatus, comprising:
   a non-transitory computer-readable medium including computer-executable instructions; and a processor, connected to the non-transitory computer-readable medium, wherein the processor is configured to execute the computer-executable instructions to cause the apparatus, which is a distributed unit, to perform operations comprising:

determining, by the distributed unit, whether an indication of a central unit is received;

in response to the distributed unit receiving the indication of the central unit, determining, by the distributed unit based on the indication of the central unit, to transmit a first data packet of a first service in a first transmission mode, wherein the first transmission mode is a point-to-point transmission mode or a point-to-multipoint transmission mode; and transmitting, by the distributed unit, the first data packet in the first transmission mode.

15. The apparatus according to claim 14, wherein the operations further comprise:

in response to the distributed unit not receiving the indication of the central unit, determining, by the distributed unit to transmit the first data packet of the first service in the first transmission mode.

16. The apparatus according to claim 14, wherein the determining, by the distributed unit based on the indication of the central unit, to transmit the first data packet of the first service in the first transmission mode includes:

receiving, by the distributed unit, first indication information from the central unit, wherein the first indication information indicates the distributed unit to transmit the first data packet in the first transmission mode.

17. The apparatus according to claim 16, wherein the first indication information indicates the distributed unit to transmit the first data packet to a first terminal device in the first transmission mode.

18. The apparatus according to claim 16, wherein the first indication information is carried in a header corresponding to the first data packet of the first service.

19. The apparatus according to claim 14, wherein the determining, by the distributed unit based on the indication of the central unit, to transmit the first data packet of the first service in the first transmission mode includes:

receiving, by the distributed unit, the first data packet from the central unit through a first transmission channel, wherein in response to the first transmission channel corresponding to one terminal device, the first transmission mode is the point-to-point transmission mode; and in response to the first transmission channel corresponding to a plurality of terminal devices, the first transmission mode is the point-to-multipoint transmission mode.

20. The apparatus according to claim 16, wherein the first indication information includes a bit string, and each bit in the bit string corresponds to a corresponding terminal device among a plurality of terminal devices, wherein in response to said each bit being a first logic value, the transmitting the first data packet in the first transmission mode comprises transmitting, by the distributed unit, the first data packet to the corresponding terminal device in the first transmission mode being the point-to-point transmission mode, and in response to said each bit being a second logic value different from the first logic value, the transmitting the first data packet in the first transmission mode comprises transmitting, by the distributed unit, the first data packet to the corresponding terminal device in the first transmission mode being the point-to-multipoint transmission mode.

* * * * *